United States Patent [19]

Röckrath et al.

[11] Patent Number: 5,716,678
[45] Date of Patent: Feb. 10, 1998

[54] PROCESS FOR THE PRODUCTION OF A TWO-COAT FINISH ON A SUBSTRATE SURFACE

[75] Inventors: Ulrike Röckrath, Senden; Georg Wigger, Münster; Fritz Bartol, Hamm; Peter Betz, Münster; Wilfried Stübbe, Greven; Angelika Bartelt, Münster, all of Germany

[73] Assignee: BASF Lacke + Farben, AG, Muenster-Hiltrup, Germany

[21] Appl. No.: 525,631

[22] PCT Filed: Mar. 26, 1994

[86] PCT No.: PCT/EP94/00965

§ 371 Date: Nov. 17, 1995

§ 102(e) Date: Nov. 17, 1995

[87] PCT Pub. No.: WO94/22969

PCT Pub. Date: Oct. 13, 1994

[30] Foreign Application Priority Data

Mar. 31, 1993 [DE] Germany ............... 43 10 414.2

[51] Int. Cl.$^6$ ............... B05D 1/38; B05D 3/02; C08L 33/06; C08G 18/63
[52] U.S. Cl. .......... 427/407.1; 427/379; 524/548; 524/590; 524/561; 525/124; 525/127; 525/458; 525/440; 528/45; 528/66
[58] Field of Search ............... 427/379, 407.1, 427/409; 524/548, 561, 590, 839; 525/127, 440, 457, 458; 528/45, 66

[56] References Cited

U.S. PATENT DOCUMENTS

| | | | |
|---|---|---|---|
| 4,371,657 | 2/1983 | Chang | 524/512 |
| 4,382,114 | 5/1983 | Hohlein et al. | 427/409 |
| 4,396,672 | 8/1983 | Adesko | 428/323 |
| 4,603,064 | 7/1986 | Kania | 427/407.1 |
| 4,873,285 | 10/1989 | Runtz | 525/28 |
| 4,952,626 | 8/1990 | Kordomenos et al. | 525/28 |
| 5,066,698 | 11/1991 | Hazan et al. | 524/269 |
| 5,102,692 | 4/1992 | Tanigami et al. | 427/142 |
| 5,279,862 | 1/1994 | Corcoran et al. | 427/142 |
| 5,476,898 | 12/1995 | dos Santos | 524/548 |
| 5,502,101 | 3/1996 | Schwarte et al. | 427/407.1 |
| 5,510,443 | 4/1996 | Shaffer | 427/407.1 |
| 5,574,102 | 11/1996 | Tanigami et al. | 525/124 |
| 5,593,733 | 1/1997 | Mayo | 427/407.2 |

OTHER PUBLICATIONS

Chemical Abstract, vol. 114, p. 110, "Clear coating materials in two–coat–one–base coating process", Nakao Yasushi et al.; 145577a, Oct. 1990.

*Primary Examiner*—Diana Dudash
*Attorney, Agent, or Firm*—Anne Gerry Sabourin

[57] ABSTRACT

A process is disclosed for producing a double-layered covering lacquer by using a transparent covering lacquer containing a hydroxyl group-containing polyacrylate resin produced by polymerizing (a) 10 to 51% by weight 4-hydroxy-n-butylacrylate or 4-hydroxy-n-butylmethacrylate or a mixture of 4-hydroxy-n-butylacrylate and 4-hydroxy-n-butylmethacrylate; (b) 0 to 36% by weight of a hydroxyl group-containing ester of acrylic acid different from (a) or a hydroxyl group-containing ester of methacrylic acid or a mixture of such monomers; (c) 28 to 85% by weight of an aliphatic or cycloaliphatic ester of methacrylic acid different from (a) and (b) with at least 4 C atoms in the alcohol residue or a mixture of such monomers; (d) 0 to 3% by weight of an ethylenically unsaturated carboxylic acid or a mixture of ethylenically unsaturated carboxylic acids and (e) 0 to 20% by weight of an ethylenically unsaturated monomer different from (a), (b), (c) and (d) or a mixture of such monomers, into a polyacrylate resin with a hydroxyl number from 60 to 200, an acid number from 0 to 35 and a number average molecular weight from 1,500 to 10,000. The sum of the parts by weight of components (a), (b), (c), (d) and (e) is always 100% by weight and the composition of the component (c) is selected so that when said component (c) is polymerized alone, a polymethacrylate resin having a glass transition temperature from +10° to +10° C. is obtained.

6 Claims, No Drawings

PROCESS FOR THE PRODUCTION OF A TWO-COAT FINISH ON A SUBSTRATE SURFACE

FIELD OF THE INVENTION

The invention relates to a process for the production of a two-coat finish on a substrate surface, in which (1) a pigmented basecoat is applied to the substrate surface, (2) the basecoat film applied in step (1) is dried, (3) a nonaqueous, transparent topcoat containing
   (A) a hydroxyl group-containing polyacrylate resin and
   (B) a crosslinking agent is applied to the basecoat film dried in step (2), and subsequently (4) basecoat and topcoat are baked together.

The invention also relates to nonaqueous coating materials suitable, in particular, for the process described above.

BACKGROUND AND SUMMARY OF THE INVENTION

The above-described process for the production of a two-coat finish of the basecoat/clearcoat type is known and is employed in particular for the production of two-coat finishes, especially two-coat metallic finishes, on car bodies (cf. e.g. U.S. Pat. No. 3,639,147 and EP-A-38 127).

The finishes which can be produced with the basecoat/clearcoat process, in comparison to one-coat finishes, are distinguished by an improved rendering of the effect and by the possibility producing finishes having brighter and purer colors.

The basecoat applied first in step (1) determines, depending on the nature, quantity and spatial orientation of the pigments employed, the color and—if relevant—the effect (e.g. metallic effect or pearlescent effect) of the finish.

In step (2) of the process, in a flash-off phase, at least part of the organic solvents or at least part of the water is removed from the basecoat film applied in step (1). Step (3) comprises the application, to this initially dried but not baked basecoat, of a nonaqueous, transparent topcoat (wet-on-wet method), and in step (4) basecoat and topcoat are then baked together.

The transparent topcoat applied in step (3) gives the two-coat finish gloss and fullness and protects the pigmented coat applied in step (1) against chemical and physical attack.

The process under discussion can only furnish high-quality two-coat finishes if the transparent topcoat applied in step (3) does not interfere with the basecoat applied in steps (1) and (2) in such a way that the optical effect is impaired (e.g. clouding). On the other hand, the transparent topcoat must have a composition such that, after the baking procedure carried out in step (4), it adheres well to the basecoat. Other important properties which the transparent topcoat obtained after the baking procedure must have are high transparency, good gloss and good mechanical properties, such as hardness, scratch resistance and elasticity. The transparent topcoat obtained after the baking procedure must not at least have a high resistance to climatic effects (e.g. temperature fluctuations, moisture in the form of water vapor, rain or dew, radiation stress etc.) and against attack by acids or other chemicals, for example organic solvents.

JP-A-1-158079 describes nonaqueous, transparent topcoats, for two-coat finishes of the basecoat/clearcoat type, which contain a polyacrylate resin which contains hydroxyl groups and is obtainable by polymerizing from 10 to 50% by weight of an adduct of a cyclic ester, for example caprolactone, with hydroxyethyl acrylate or methacrylate, from 0 to 40% by weight of a hydroxyalkyl acrylate or methacrylate and from 30 to 80% by weight of a copolymerizable vinyl monomer, to give a polyacrylate resin having a hydroxyl number of from 60 to 160, an acid number of from 0 to 40 and a glass transition temperature of from −50° to +40° C. The transparent topcoats described in JP-A-1-158079 give finishes which, in particular with regard to their acid resistance, are in need of improvement.

The present invention relates to a process for the production of a two-coat finish, as described above, in which in step (3) a nonaqueous, transparent topcoat is applied which contains a hydroxyl group-containing polyacrylate resin which is obtainable by polymerizing (a) from 10 to 51% by weight of 4-hydroxy-n-butyl acrylate or 4-hydroxy-n-butyl methacrylate or a mixture of 4-hydroxy-n-butyl acrylate and 4-hydroxy-n-butyl methacrylate, (b) from 0 to 36% by weight of a hydroxyl group-containing ester of acrylic acid or of a hydroxyl group-containing ester of methacrylic acid, which is different from (a), or of a mixture of such monomers, (c) from 28 to 85% by weight of an aliphatic or cycloaliphatic ester of methacrylic acid which is different from (a) and (b) and has at least 4 carbon atoms in the alcohol radical, or of a mixture of such monomers, (d) from 0 to 3% by weight of an ethylenically unsaturated carboxylic acid or of a mixture of ethylenically unsaturated carboxylic acids, and (e) from 0 to 20% by weight of an ethylenically unsaturated monomer which is different from (a), (b), (c) and (d), or of a mixture of such monomers, to give a polyacrylate resin having a hydroxyl number of from 60 to 200, an acid number of from 0 to 35 and a number-average molecular weight of from 1500 to 10,000, the sum of the proportions by weight of components (a), (b), (c), (d) and (e) always being 100% by weight and the composition of component (c) being selected such that the polymethacrylate resin resulting from homopolymerization of component (c) has a glass transition temperature of from +10° to +100° C.

The two-coat finishes produced by the process according to the invention are distinguished by a high degree of hardness, high gloss, good adhesion between basecoat and topcoat, good topcoat appearance, good scratch resistance and good resistance to climatic effects, organic solvents and acids, as well as a high resistance to yellowing (especially to yellowing caused by high baking temperatures and/or by long baking times). These good properties are also obtained when using different basecoats.

DETAILED DESCRIPTION

In step (1) of the process according to the invention it is possible in principle to employ all pigmented basecoats which are suitable for the production of two-coat finishes. Basecoats of this kind are well known to the person skilled in the art. Both water-dilutable basecoats and basecoats based on organic solvents can be employed. Suitable basecoats are described in, for example, U.S. Pat. No. 3,639,147, DE-A-33 33 072, DE-A-38 14 853, GB-A-2 012 191, U.S. Pat. No. 3,953,644, EP-A-260 447, DE-A-39 03 804, EP-A-320 552, DE-A-36 28 124, U.S. Pat. No. 4,719,132, EP-A-297 576, EP-A-69 936, EP-A-89 497, EP-A-195 931, EP-A-228 003, EP-A-38 127 and DE-A-28 18 100.

These patent documents also include further information concerning the basecoat/clearcoat process under discussion.

In step (2) of the process according to the invention, the basecoat film applied in step (1) is dried, i.e. in a flash-off phase at least part of the organic solvents and/or of the water is removed from the basecoat film. The basecoat film is generally dried at temperatures from room temperature to 80° C.

The nonaqueous, transparent topcoats employed in accordance with the invention contain a hydroxyl group-containing polyacrylate resin which is obtainable by polymerizing (a) from 10 to 51, preferably from 25 to 41, % by weight of 4-hydroxy-n-butyl acrylate or 4-hydroxy-n-butyl methacrylate or a mixture of 4-hydroxy-n-butyl acrylate and 4-hydroxy-n-butyl methacrylate, (b) from 0 to 36% by weight, preferably from 0 to 20% by weight, of a hydroxyl group-containing ester of acrylic acid or of a hydroxyl group-containing ester of methacrylic acid, which is different from (a), or of a mixture of such monomers, (c) from 28 to 85% by weight, preferably from 40 to 70% by weight, of an aliphatic or cycloaliphatic ester of methacrylic acid which is different from (a) and (b) and has at least 4 carbon atoms in the alcohol radical, or of a mixture of such monomers, (d) from 0 to 3, preferably from 0 to 2, % by weight of an ethylenically unsaturated carboxylic acid or of a mixture of ethylenically unsaturated carboxylic acids, and (e) from 0 to 20, preferably from 5 to 15, % by weight of an ethylenically unsaturated monomer which is different from (a), (b), (c) and (d), or of a mixture of such monomers, to give a polyacrylate resin having a hydroxyl number of from 60 to 200, preferably from 100 to 160, an acid number of from 0 to 35, preferably from 0 to 25, and a number-average molecular weight of from 1500 to 10,000, preferably from 2500 to 5000, the sum of the proportions by weight of components (a), (b), (c), (d) and (e) always being 100% by weight and the composition of component (c) being chosen such that the polymethacrylate resin resulting from homopolymerization of component (c) has a glass transition temperature of from +10° to +100° C., preferably from +20° to +60° C.

The polyacrylate resins employed in accordance with the invention can be prepared by polymerization methods which are generally well known. Polymerization methods for the preparation of polyacrylate resins are generally known and described in numerous references (cf. e.g.: Houben-Weyl, Methoden der organischen Chemie [Methods of Organic Chemistry], 4th edition, volume 14/1, page 24 to 255 (1961)).

The polyacrylate resins employed in accordance with the invention are preferably prepared using the solution polymerization method. In this case it is conventional to heat an initial charge of an organic solvent or solvent mixture to boiling. The monomer mixture to be polymerized and one or more polymerization initiators are then added continuously to this organic solvent or solvent mixture. Polymerization takes place at temperatures between 100° and 160° C., preferably between 130° and 150° C. The polymerization initiators which are preferably employed are initiators which form free radicals. The nature and quantity of initiator are usually chosen so that, as far as possible, the supply of radicals is constant at the polymerization temperature during the feed phase.

Examples of initiators which can be employed are dialkyl peroxides such as di-tert-butyl peroxide and dicumyl peroxide; hydroperoxides such as cumene hydroperoxide and tert-butyl hydroperoxide; and peresters such as tert-butyl perbenzoate, tert-butyl perpivalate, tert-butyl per-3,5,5-trimethylhexanoate and tert-butyl per-2-ethylhexanoate.

The polymerization conditions (reaction temperature, feed time of the monomer mixture, quantity and nature of the organic solvents and polymerization initiators, possible use of molecular weight regulators such as, for example, mercaptans, thioglycolic esters and hydrogen chlorides) are chosen such that the polyacrylate resins employed in accordance with the invention have a number-average molecular weight of from 1500 to 10,000, preferably from 2500 to 5000 (determined by gel permeation chromatography using polystyrene as calibration substance).

The acid number of the polyacrylate resins employed in accordance with the invention can be adjusted by a person skilled in the art via the use of corresponding quantities of component (d). Analogous comments apply to the adjustment of the hydroxyl number. It can be controlled via the quantity of component (a) and (b) employed.

As component (a), 4-hydroxy-n-butyl acrylate, 4-hydroxy-n-butyl methacrylate or a mixture of 4-hydroxy-n-butyl acrylate and 4-hydroxy-n-butyl methacrylate is employed. It is preferred to employ 4-hydroxy-n-butyl acrylate as component (a).

As component (b) it is possible—on condition that the polyacrylate resin resulting from homopolymerization of component (b) has a glass transition temperature of from 0° to +80° C., preferably from +20° to +60° C.—in principle to employ any ester of acrylic acid or methacrylic acid which contains hydroxyl groups and is different from (a), or a mixture of such monomers. Examples are hydroxyalkyl esters of acrylic acid such as, for example, hydroxyethyl acrylate and hydroxypropyl acrylate, and hydroxyalkyl esters of methacrylic acid such as, for example, hydroxyethyl methacrylate and hydroxypropyl methacrylate. The glass transition temperature can be calculated approximately by the person skilled in the art using the formula $$\frac{1}{T_G} = \sum_{n=1}^{n=x} \frac{W_n}{T_{Gn}}$$

$T_G$=glass transition temperature of the polymer
x=number of different copolymerized monomers,
$W_n$=proportion by weight of the nth monomer
$T_{Gn}$=glass transition temperature of the homopolymer of the nth monomer.

It is possible in principle to employ as component (c) any aliphatic or cycloaliphatic ester of methacrylic acid, having at least 4 carbon atoms in the alcohol radical, which is different from (a) and (b), or a mixture of such monomers. Examples are aliphatic esters of methacrylic acid having from 4 to 20 carbon atoms in the alcohol radical, for example n-butyl, iso-butyl, tert-butyl, 2-ethylhexyl, stearyl and lauryl methacrylate, and cycloaliphatic esters of methacrylic acid, for example cyclohexyl methacrylate. The composition of component (c) is selected such that the polymethacrylate resin resulting from homopolymerization of component (c) has a glass transition temperature of from +10° to +100° C., preferably from +20° to +60° C.

It is possible in principle to employ as component (d) any ethylenically unsaturated carboxylic acid or a mixture of ethylenically unsaturated carboxylic acids. It is preferred to employ as component (d) acrylic acid and/or methacrylic acid.

It is possible in principle to employ as component (e) any ethylenically unsaturated monomer which is different from (a), (b), (c) and (d), or a mixture of such monomers. Examples of monomers which can be employed as component (e) are vinylaromatic hydrocarbons, such as styrene, an α-alkylstyrene and vinyltoluene, amides of acrylic acid and methacrylic acid, for example methacrylamide and acrylamide; nitriles of methacrylic acid and acrylic acid; vinyl ethers and vinyl esters. It is preferred to employ as component (e) vinylaromatic hydrocarbons, especially styrene.

The composition of component (e) is preferably selected such that the polymer resulting from homopolymerization of component (e) has a glass transition temperature of from +70° to +120° C., preferably from +80° to +100° C.

The nonaqueous, transparent topcoats employed in accordance with the invention may in principle contain, as crosslinking agent (B), any crosslinking agent or mixture of crosslinking agents which is suitable for the crosslinking of hydroxyl group-containing polyacrylate resins. It is preferred to employ amino resins or blocked or non-blocked polyisocyanates, or mixtures of amino resins and blocked or non-blocked polyisocyantes as crosslinking agent (B).

Amino resins are well known to the person skilled in the art and are offered as commercial products by numerous companies. They are the condensation products of aldehydes, especially formaldehyde, and—for example—urea, melamine, guanamine and benzoguanamine. The amino resins contain alcohol groups, preferably methylol groups, which are generally in part, or preferably completely, etherified with alcohols. The melamine-formaldehyde resins which are employed are in particular those etherified with lower alcohols, especially with methanol or butanol. It is very particularly preferred to employ as component (B) melamine-formaldehyde resins which are etherified with lower alcohols, especially with methanol and/or ethanol and/or butanol, and which still contain on average from 0.1 to 0.25 hydrogen atoms attached to nitrogen atoms per triazine ring.

It is possible in principle to employ as component (B) any polyisocyanate which can be employed in the paints sector, or a mixture of such polyisocyanates. It is, however, preferred to employ polyisocyanates whose isocyanate groups are attached to aliphatic or cycloaliphatic radicals. Examples of such polyisocyanates are hexamethylene diisocyanate, isophorone diisocyanate, trimethylhexamethylene diisocyanate, dicyclohexylmethane diisocyanate and 1,3-bis (2-isocyanatoprop-2-yl)benzene (TMXDI) and adducts of these polyisocyanates with polyols, especially low molecular weight polyols, for example trimethylolpropane, and polyisocyanates which are derived from these polyisocyanates and contain isocyanurate groups and/or biuret groups. The polyisocyanates employed are particularly preferably hexamethylene diisocyanate and isophorone diisocyanate, polyisocyanates which are derived from these diisocyanates and contain isocyanurate and/or biuret groups and which preferably contain more than 2 isocyanate groups in the molecule, and reaction products of hexamethylene diisocyanate and isophorone diisocyanate, or of a mixture of hexamethylene diisocyanate and isophorone diisocyanate, with from 0.3 to 0.5 equivalents of a low molecular weight polyol having a molecular weight of from 62 to 500, preferably from 104 to 204, especially a triol such as, for example, trimethylolpropane.

Polyisocyanates can be employed either in the free form or else in blocked form as crosslinking agents (B).

For blocking the polyisocyanates, it is possible in principle to use any blocking agent which can be employed for blocking polyisocyanates, which has a sufficiently low deblocking temperature. Blocking agents of this kind are well known to the person skilled in the art and require no further description here. It is preferred to employ blocked polyisocyanates which contain isocyanate groups which are blocked both with a blocking agent (I) and with a blocking agent (II), where the blocking agent (I) is a dialkyl malonate or a mixture of dialkyl malonates the blocking agent (II) is a CH-acidic blocking agent which is different from (I), or is an oxime, or a mixture of these blocking agents, and the ratio of equivalents between the isocyanate groups blocked with (I) and the isocyanate groups blocked with (II) is between 1.0:1.0 and 9.0:1.0, preferably between 8.0:2.0 and 6.0:4.0 and particularly preferably between 7.5:2.5 and 6.5:3.5.

The blocked polyisocyanates which are preferably employed can be prepared as follows. A polyisocyanate or a mixture of polyisocyanates is reacted in a manner known per se with a mixture of the blocking agents (I) and (II), the mixture of the blocking agents (I) and (II) containing the blocking agents (I) and (II) in a molar ratio of between 1.0:1.0 and 9.0:1.0, preferably between 8.0:2.0 and 6.0:4.0 and particularly preferably between 7.5:2.5 and 6.5:3.5. The polyisocyanate or the mixture of polyisocyanates can be reacted with the mixture of the blocking agents (I) and (II) to the extent that no further isocyanate groups can be detected. In practice, the use of very large excesses of blocking agents and/or very long reaction times may be necessary for this. It has now been found, surprisingly, that coating materials having the good properties described above are obtained even when at least 50, preferably at least 70, percent of the isocyanate groups of the polyisocyanate or of the mixture of polyisocyanates are reacted with the mixture of the blocking agents (I) and (II) and the remaining isocyanate groups are reacted with a compound which contains hydroxyl groups, or a mixture of compounds which contain hydroxyl groups. The hydroxyl group-containing compounds used are preferably low molecular weight aliphatic or cycloaliphatic polyols such as neopentylglycol, dimethylolcyclohexane, ethylene glycol, diethylene glycol, propylene glycol, 2-methyl-2-propylpropane 1,3 diol, 2-ethyl-2-butylpropane 1,3 diol, 2,2,4 trimethylpentane 1,5 diol and 2,2,5 trimethylhexane-1,6-diol or the hydroxyl group-containing polyacrylate resins which can be employed as component (A).

The blocked polyisocyanates which are preferably employed can also be obtained by mixing blocked polyisocyanates with the blocking agents (I) and/or (II) in a ratio such that the mixture obtained has a ratio of equivalents between the isocyanate groups blocked with (I) and the isocyanate groups blocked with (II) of between 1.0:1.0 and 9.0:1.0, preferably between 8.0:2.0 and 6.0:4.0 and particularly preferably between 7.5:2.5 and 6.5:3.5.

Dialkyl malonates or a mixture of dialkyl malonates are employed as blocking agent (I).

Examples of dialkyl malonates which can be employed are dialkyl malonates having from 1 to 6 carbon atoms in each of the alkyl radicals, for example dimethyl malonate and diethyl malonate, with diethyl malonate preferably being employed.

Blocking agents which are different from (I) and contain active methylene groups, and oximes, and mixtures of these blocking agents are employed as blocking agent (II).

Examples of blocking agents which can be employed as blocking agent (II) are methyl, ethyl, propyl, butyl, pentyl, hexyl, heptyl, octyl, nonyl, decyl or dodecyl acetoacetate, acetone oxime, methyl ethyl ketoxime, acetyl acetone, formaldoxime, acetaldoxime, benzophenoxime, acetoxime and diisobutyl ketoxime. As blocking agent (II) it is preferred to employ an alkyl acetoacetate having from 1 to 6 carbon atoms in the alkyl radical, or a mixture of such alkyl acetoacetates, or a ketoxime or a mixture of ketoximes. Particular preference is given to employing alkyl acetoacetates or methyl ethyl ketoxime as blocking agent (II).

Components (A) and (B) are employed in the transparent topcoats employed in accordance with the invention, in general, in amounts such that component (A) is present in an amount of from 50 to 90, preferably from 60 to 75, % by weight and component (B) is present in an amount of from 10 to 50, preferably from 25 to 40, % by weight, the percentages by weight being based on (A)+(B)=100% by weight.

The transparent topcoats employed in accordance with the invention contain no pigments or only contain transparent pigments. As organic solvents, the topcoats contain conventional organic solvents which are customarily used for the production of coating materials. Furthermore, the topcoats may also contain other customary additives such as, for example, light stabilizers, leveling assistants etc.

The two-coat finishes prepared using the topcoats employed in accordance with the invention exhibit the advantageous properties especially when they have been baked under the baking conditions currently employed in the production-line finishing of cars (30 minutes at 130° C. or 20 minutes at 140° C.).

Using the components (A) and (B) described above, it is also possible to produce pigmented nonaqueous paints, which are not transparent. In order to achieve this, it is possible in principle to employ all organic or inorganic pigments which are suitable for the production of pigmented nonaqueous paints, or mixtures of such pigments. Examples of pigments which can be employed are azo pigments (e.g. Pigment Red 57:1, Pigment Yellow 1, Pigment Yellow 13 and Pigment Red 7), Phtalocyanine pigments (e.g. Pigment Blue 15:3 and Phtalocyanine Green), carbonyl pigments (e.g. Pigment Red 88, Pigment Red 177, Pigment Yellow 123, Pigment Violet 19, Pigment Yellow 24 and Pigment Orange 51 and 52), dioxazine pigments (e.g. Pigment Violet 23), titanium dioxide, color black, iron oxide black (magnetite, triiron tetroxide), iron oxide red (hematite, A-diiron trioxide), iron oxide yellow (iron oxide hydroxide), iron oxide brown (mixed pigment of iron oxide red, iron oxide yellow and iron oxide black), chromium oxide green (dichromium trioxide), nickel-titanium yellow, chromium titanium yellow and cobalt blue. In addition, it is also possible to employ special-effect pigments, for example metal flake pigments, especially aluminum flake pigments, and pearlescent pigments. In the preparation of pigmented nonaqueous paints which are not transparent, components (A) and (B) and the pigment or the mixture of pigments are generally employed in amounts such that component (A) is present in an amount of from 50 to 90, preferably from 60 to 75, % by weight, component (B) is present in an amount of from 9 to 50, preferably from 20 to 40, % by weight and the pigment or the mixture of pigments is present in an amount of from 1 to 40, preferably from 5 to 15, % by weight, the percentages by weight being based on (A)+(B) +pigment or mixture of pigments=100% by weight.

Even with the pigmented nonaqueous paints which are not transparent, it is possible to produce finishes—especially one-coat finishes—having very good properties.

The invention is explained in more detail in the following examples. All quantities and percentages are to be understood as being by weight unless expressly stated otherwise.

I Preparation of polyacrylate resins according to the invention

Polyacrylate resin solution (1)

879 parts of a commercial aromatic solvent mixture (Solvesso®, manufacturer: Esso) having a boiling range of from 158° to 172° C. are placed in a steel vessel fitted with monomer feed, initiator feed, thermometer, oil heating and reflux condenser and are heated to 140° C. A mixture α of 87 parts of the aromatic solvent mixture and 87 parts of t-butyl peroctanoate is then added with stirring at a rate such that the addition of the mixture α is complete after 4.75 h. 15 min after commencement of the addition of the mixture α, a mixture β comprising 819 parts of n-butyl methacrylate, 145 parts of i-butyl methacrylate and 483 parts of butane-1,4-diol monoacrylate is added to the reaction mixture at a rate such that the addition of the mixture β is complete after 4 h. When the addition of the mixture α is complete, the reaction mixture is maintained for a further 2 h at 140° C. and then cooled to room temperature.

The acrylate resin solution obtained has a solids content of 60% (1 h, 130° C.; circulating-air oven), a viscosity of 4.5 dPas (ICI plate/cone viscometer, 23° C.) and an acid number of 1.2 (based on the solids content).

Polyacrylate resin solution (2)

879 parts of a commercial aromatic solvent having a boiling range of from 158° to 172° C. (Solvesso®) are placed in a steel vessel fitted with monomer feed, initiator feed, thermometer, oil heating and reflux condenser and are heated to 140° C. A mixture α of 87 parts of the aromatic solvent mixture and 87 parts of t-butyl peroctanoate is then added with stirring at a rate such that the addition of the mixture α is complete after 4.75 h. 15 min after commencement of the addition of the mixture α, a mixture β comprising 290 parts of cyclohexyl methacrylate, 709 parts of n-butyl methacrylate, 233 parts of butane-1,4-diol monoacrylate, 200 parts of hydroxypropyl methacrylate and 15 parts of acrylic acid is added to the reaction mixture at a rate such that the addition of the mixture β is complete after 4 h. When the addition of the mixture α is complete, the reaction mixture is maintained for a further 2 h at 140° C. and then cooled to room temperature.

The acrylate resin solution obtained has a solids content of 60% (1 h, 130° C.; circulating-air oven), a viscosity of 7.0 dPas (ICI plate/cone viscometer, 23° C.) and an acid number of 9.0 (based on the solids content).

II Preparation of crosslinking agents

Solution of a blocked polyisocyanate 504 parts of a commercial isocyanurate trimer of hexamethylene diisocyanate and 257.2 parts of a commercial aromatic solvent mixture (Solvesso®) are weighed into a steel vessel fitted with feed vessel, thermometer, oil heating and reflux condenser. The solution is heated to 50° C. A mixture of 348 parts of diethyl malonate, 104 parts of ethyl acetoacetate and 2.5 parts of a 50% strength solution of sodium p-dodecylphenolate in xylene is then metered in over the course of 2 hours at a rate such that the temperature does not exceed 70° C. The mixture is then heated slowly to 90° C. and maintained at this temperature for 5 hours. A further 2.5 parts of sodium p-dodecylphenolate solution are then added, and the mixture is maintained at 90° C. until the content of NCO groups in the reaction mixture has reached 0.48%. 35.1 parts of n-butanol are then added. The resulting solution has a nonvolatile content of 59.6% (60 min, 130° C.) and a viscosity of 590 mPas measured in an ICI plate/cone viscometer at 23° C.

Solution of a non-blocked polyisocyanate 88.8 parts of a commercial 90% strength solution of the isocyanurate trimer of hexamethylene diisocyanate are mixed thoroughly with 5.6 parts of butyl acetate and 5.6 parts of a commercial aromatic solvent mixture (Solvesso®).

(III) Production of transparent topcoats according to the invention

Topcoat (1)

72.7 parts of the polyacrylate resin solution (1), 6.8 parts of the solution of the blocked polyisocyanate and 14.1 parts of a commercial melamine resin which contains imino groups and is etherified with n-butanol (80% strength in butanol; Cymel® 1158; Cyanamid) are mixed thoroughly by stirring with a laboratory turbine agitator. 4.7 parts of butyl glycol, 4.0 parts of butanol and 2.0 parts of a commercial 5% strength solution of a leveling assistant based on a polysiloxane are added to this mixture and stirred in thoroughly. 1.1 parts of a commercial UV absorber (substituted benzotriazole) and 1.1 parts of a commercial free-radical scavenger (1,4,6-substituted benzotriazole), together with 3.0 parts of xylene, are then stirred until they are completely dissolved. The resulting solution is then added to the coating components already premixed and mixed in thoroughly. The transparent topcoat obtained in this way is adjusted with xylene to a viscosity of 23 sec, measured in a DIN 4 cup at 20° C.

Topcoat (2) 78.0 parts of the polyacrylate resin solution (2) are mixed thoroughly, by stirring with a laboratory turbine agitator, with 8.0 parts of butylglycol acetate, 5.5 parts of butyl acetate and 3.0 parts of a commercial 5% strength solution of a leveling assistant based on a polysiloxane. 1.5 parts of a commercial UV absorber (substituted benzotriazole) and 1.0 parts of a commercial free-radical scavenger (1,4,6-substituted benzotriazole), together with 3.0 parts of xylene, are then stirred until they are completely dissolved. The resulting solution is then added to the coating components already premixed and mixed in thoroughly. Finally, 23.4 parts of the solution of the non-blocked polyisocyanate are added and mixed in thoroughly. The transparent topcoat obtained in this way is adjusted with xylene to a viscosity of 23 sec, measured in a DIN 4 cup at 20° C.

IV Production of two-coat finishes

Steel panels coated with a commercial electro-deposition coating and a commercial filler are spray-coated with a commercial, nonaqueous basecoat which contains aluminum pigment, are dried for 5 minutes at room temperature and then are coated over with the transparent topcoats (dry film thickness 40–45 µm). After a further drying time of 5 minutes at room temperature, the basecoat and topcoat are baked together for 20 minutes at 140° C. in a circulating-air oven. The resulting finishes are distinguished by a high degree of hardness, high gloss, good adhesion between basecoat and topcoat and good topcoat appearance. A particular advantage of the finishes is that they exhibit both a very good scratch resistance and a very good acid resistance.

What is claimed is:

1. A process for the production of a two-coat finish on a substrate surface, comprising the steps of:

(1) applying a pigmented basecoat to the substrate surface, (2) drying the basecoat film applied in step (1), (3) applying to the basecoat film dried in step (2) a nonaqueous, transparent topcoat comprising (A) a hydroxyl group-containing polyacrylate resin and (B) a crosslinking agent, wherein the crosslinking agent is a mixture of at least one amino resin and a member selected from the group consisting of blocked polyisocyanates, unblocked polyisocyanates, and mixtures thereof, and (4) baking and curing the basecoat and the topcoat together, wherein the hydroxyl group-containing polyacrylate resin of the nonaqueous, transparent topcoat is obtained by polymerizing (a) from 10 to 51% by weight of a compound selected from the group consisting of 4-hydroxy-n-butyl acrylate, 4-hydroxy-n-butyl methacrylate, and mixtures thereof, (b) from 0 to 36% by weight of a compound selected from the group consisting of hydroxyl group-containing esters of acrylic acid, hydroxyl group-containing esters of methacrylic acid, and mixtures thereof, wherein the compound is different from (a), (c) from 28 to 85% by weight of a compound selected from the group consisting of aliphatic esters of methacrylic acid, cycloaliphatic esters of methacrylic acid, and mixtures thereof, wherein the compound is different from (a) and (b) and has at least 4 carbon atoms in the alcohol radical, (d) from 0 to 3% by weight of a compound selected from the group consisting of ethylenically unsaturated carboxylic acids and mixtures thereof, and (e) from 0 to 20% by weight of a compound selected from the group consisting of ethylenically unsaturated monomers which are different from (a), (b), (c) and (d), and mixtures thereof, to give a polyacrylate resin having a hydroxyl number of from 60 to 200, an acid number of from 0 to 35, and a number-average molecular weight of from 1500 to 10,000, the sum of the proportions by weight of components (a), (b), (c), (d), and (e) always being 100% by weight, and the composition of component (c) being selected such that the polymethacrylate resin resulting from homopolymerization of component (c) has a glass transition temperature of from +10° to +100° C.

2. A nonaqueous coating composition comprising (A) a hydroxyl group-containing polyacrylate resin and (B) a crosslinking agent, wherein the crosslinking agent is a mixture of at least one amino resin and a member selected from the group consisting of blocked polyisocyanates, unblocked polyisocyanates, and mixtures thereof, wherein component (A) is a hydroxyl group-containing polyacrylate resin that is obtained by polymerizing (a) from 10 to 51% by weight of a compound selected from the group consisting of 4-hydroxy-n-butyl acrylate, 4-hydroxy-n-butyl methacrylate, and mixtures thereof, (b) from 0 to 36% by weight of a compound selected from the group consisting of a hydroxyl group-containing ester of acrylic acid, hydroxyl group-containing ester of methacrylic acid, and mixtures thereof, wherein the compound is different from (a), (c) from 28 to 85% by weight of a compound selected from the group consisting of an aliphatic ester of methacrylic acid, a cycloaliphatic ester of methacrylic acid, and mixtures thereof, wherein the compound is different from (a) and (b) and has at least 4 carbon atoms in the alcohol radical, (d) from 0 to 3% by weight of a compound selected from the group consisting of ethylenically unsaturated carboxylic acids and mixtures thereof, and (e) from 0 to 20% by weight of a compound selected from the group consisting of ethylenically unsaturated monomers which are different from (a), (b), (c), and (d), and mixtures thereof, to give a polyacrylate resin having a hydroxyl number of from 60 to 200, an acid number of from 0 to 35, and a number-average molecular weight of from 1500 to 10,000, the sum of the proportions by weight of components (a), (b), (c), (d), and (e) always being 100% by weight, and the composition of component (c) being selected such that the polymethacrylate resin resulting from homopolymerization of component (c) has a glass transition temperature of from +10° to +100° C.

3. A process according to claim 1, wherein component (e) is selected such that the polymer resulting from homopolymerization of component (e) has a glass transition temperature of from +70° to +120° C.

4. A process according to claim 1 wherein the hydroxyl group-containing polyacrylate resin is obtained by polymerizing from 25 to 41% by weight of component (a), from 0 to 20% by weight of component (b), from 40 to 70% by weight of component (c), from 0 to 2% by weight of component (d), and from 5 to 15% by weight of component (e) to give a polyacrylate resin having a hydroxyl number of from 100 to 160, an acid number of from 0 to 25, and a number-average molecular weight of from 2500 to 5000, the composition of component (c) being chosen such that the polymethacrylate resin resulting from homopolymerization of component (c) has a glass transition temperature of from +20° to +60° C., and component (e) being selected such that the polymer resulting from homopolymerization of component (e) has a glass transition temperature of from +80° to +100° C.

5. A coating composition according to claim 2, wherein component (e) is selected such that the polymer resulting from homopolymerization of component (e) has a glass transition temperature of from +70° to +120° C.

6. A coating composition according to claim 2, wherein the hydroxyl group-containing polyacrylate resin is obtained by polymerizing from 25 to 41% by weight of component (a), from 0 to 20% by weight of component (b), from 40 to 70% by weight of component (c), from 0 to 2% by weight of component (d), and from 5 to 15% by weight of component (e) to give a polyacrylate resin having a hydroxyl number of from 100 to 160, an acid number of from 0 to 25, and a number-average molecular weight of from 2500 to 5000, the composition of component (c) being chosen such that the polymethacrylate resin resulting from homopolymerization of component (c) has a glass transition temperature of from +20° to +60° C., and component (e) being selected such that the polymer resulting from homopolymerization of component (e) has a glass transition temperature of from +80° to +100° C.

* * * * *